Sept. 14, 1954   J. S. FRIEDMAN   2,689,180
PROCESS OF OBTAINING THREE-COLOR SEPARATION
RECORDS FROM A BIPACK COLOR FILM
Filed Dec. 30, 1950

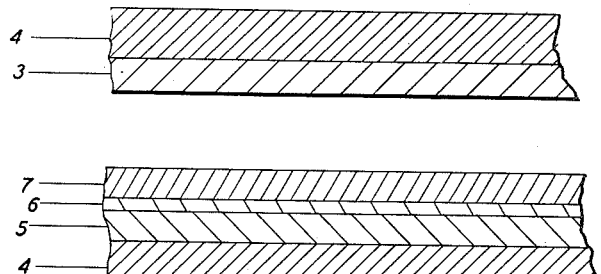

FIG. 1

3 — RED SENSITIVE EMULSION LAYER CONTAINING A GRAY COLOR FORMER OR A MIXTURE OF CYAN, MAGENTA, AND YELLOW COLOR FORMERS TO YIELD A SUBSTANTIALLY NEUTRAL GRAY DYE IMAGE.

4 — SUPPORT

5 — BLUE SENSITIVE EMULSION LAYER CONTAINING A GRAY COLOR FORMER OR A MIXTURE OF CYAN, MAGENTA, AND YELLOW COLOR FORMERS TO YIELD A SUBSTANTIALLY NEUTRAL GRAY DYE IMAGE.

6 — FILTER LAYER

7 — GREEN SENSITIVE EMULSION LAYER CONTAINING NO COLOR FORMER

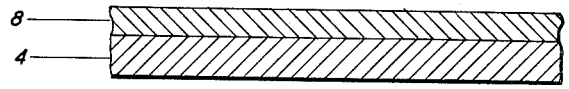

FIG. 2

4 — SUPPORT

8 — GELATIN LAYER CONTAINING AN ALKALI SULFIDE OR STANNOUS CHLORIDE

INVENTOR
JOSEPH S. FRIEDMAN
BY
ATTORNEYS

Patented Sept. 14, 1954

2,689,180

UNITED STATES PATENT OFFICE 2,689,180

PROCESS OF OBTAINING THREE-COLOR SEPARATION RECORDS FROM A BIPACK COLOR FILM

Joseph S. Friedman, Johnson City, N. Y., assignor to General Aniline & Film Corporation, New York, N. Y., a corporation of Delaware Application December 30, 1950, Serial No. 203,609

7 Claims. (Cl. 95—2)

This invention relates to color photography and particularly to a process of preparing tricolor separations from a bipack color film.

In the commercial application of color photography, particularly in the field of motion pictures, it is desirable to obtain black and white tricolor separations. There are a number of methods for accomplishing this purpose, but in all cases, severe drawbacks are present that mitigate against their use.

The method most commonly used utilizes the one shot camera which is quite delicate. It is also difficult to maintain an optimum quality and is costly both in money and light. By this method, the light beam entering the lens is split into three identical optical sub-beams. Each is then filtered through an optical filter that absorbs all the light with the exception of a single primary. In this manner three separate records are obtained, each of which is of a single primary.

In U. S. P. 1,268,847 another procedure is outlined that utilizes a bipack arrangement. The front element of the bipack is a screen plate containing yellow and magenta lines. The screen is overcoated with an orthochromatic emulsion sensitive to both blue and green light. The two sets of lines in the screen have in common the ability to transmit red light to which the orthochromatic emulsion is insensitive. Hence, the red primary will register only in the rear panchromatic element of a bipack. The yellow line of the screen will not transmit any blue light, hence behind the yellow lines of the front element only the green primary will register. In a similar manner behind the magenta lines of the front element, only the blue primary will register.

This scheme is extremely ingenious and yields three color separations upon two separate materials. The separation of the images behind the yellow and magenta lines can easily be accomplished. However, this necessitates a separate printing operation or printing with color light upon optically sensitized print material. Another more serious defect is the limitation to the definition and resolution characteristics of the separation. The resolution and definition are no better than the unit size of the sum of a yellow and magenta line.

The optical equivalent of this scheme is disclosed in U. S. P. 2,093,655 where a lenticular film, in combination with a two-banded filter in front of the lens, replaces the screen plate. Besides having the limitations noted above for the screen bipack, this scheme has the further drawback that it is optically a very difficult matter to separate the component images of a lenticular film.

Still another procedure is disclosed in U. S. P. 2,175,836. Here the front element is a material whose emulsion layer is stratified to yield two sensitivity zones. The rear element yields the third sensitivity zone. After exposure and development, the front element is not fixed but is converted into a light insensitive material that is opaque. Each side of the front element is then copied by reflection. This step is a serious restriction as the copy is generally very poor in photographic quality.

To overcome the foregoing shortcomings constitutes the principal object of the present invention.

Another object is to provide an improved method whereby three separate blue, green, and red primary separations are obtained from an exposed and processed bipack material.

The foregoing objects are accomplished by first exposing through the base side the front element of a bipack film in which the green sensitive top layer is free of color former and the lower layer, which is of the color reversal type, is blue sensitive and contains either a single color former or a mixture of cyan, magenta, and yellow color formers to yield a substantially neutral gray dye image. The emulsion layer of the rear element, which is also of the color reversal type, is red sensitive and contains a single color former or a mixture of cyan, magenta, and yellow color formers to yield a substantially neutral dye gray image.

To process the bipack, the rear element, containing the red record, is given the normal color reversal processing. The emulsion side of an auxiliary film consisting of a film base coated with a clear gelatin layer containing an alkali sulfide or stannous chloride with or without the presence of minute quantities of colloidal silver or containing colloidal metals, e .g., silver, gold, with or without the presence of a compound capable of forming a black silver image, e. g., benzothiazole, is impregnated with a developer-fixed solution of relatively high viscosity to restrict the diffusion of the solution to the upper green sensitive layer of the front element. The front element is temporarily laminated or brought into contact with the auxiliary film for approximately 1 to 2 minutes. The contacting of the front element with the emulsion layer of the auxiliary film is brought about by squeegeeing through pressure rollers. During the period of contact, there is formed by transfer development a positive silver image of the green negative record in the gelatin layer of the auxiliary film. Simultaneously the green sensitive layer is fixed and will contain only a weak silver negative record because of the restriction of the developing and fixing actions to the upper green sensitive layer of the front element. The bottom blue sensitive record will remain untouched.

After separating the auxiliary film from the front element, the former is washed in water and dried, and the latter element is subjected to an acid shortstop bath, washed in water, and given the normal reversal processing that was given the rear element. The film is washed in water and dried.

In this manner there are obtained a blue separation positive in the front element, a green primary separation positive in the auxiliary film, and a red primary color separation positive in the rear element.

In practicing the present invention, any bipack material may be employed. If desired, a yellow filter layer containing colloidal silver as disclosed in U. S. P. 2,220,187, a filter dye as disclosed in U. S. P. 2,036,546, or a yellow azo dye such as Benzo Fast Yellow RL (C. I. #349A) and the like, may be interposed between the blue and green sensitive layers of the front element.

As examples of color formers yielding upon color development neutral gray or substantially neutral gray dye images, the following may be mentioned:

N-dodecyl-1,2-hydroxynaphthoic acid-2'-aminocarbazole m-Dodecoylaminophenylhydroxynaphthothiazole sulfonic acid 4 - (α - hydroxynaphthoyl) - 4' - (p - nitrobenzoylacetyl) -dichlorobenzidine If desired, the colors obtained may be further intensified as described in British Patent 490,517.

Instead of employing the foregoing gray color formers, a mixture of cyan, magenta, and yellow color formers may be employed to yield substantially neutral gray dye images. The ratio of each of the magenta, cyan, and yellow color formers in the mixture cannot be given in definite proportions since the ratio of each dye will vary depending upon the nature of the dyes employed in admixture. The approximate ratio can be very readily determined by simple spot experiments. For example, a mixture of equal proportions of cyan, magenta, and yellow color formers may be prepared and the mixture incorporated into a silver halide emulsion layer. The emulsion layer is then exposed and color developed. The color image should be gray or substantially gray. In the event it is off-gray by a reddish, greenish, or yellowish tint, this can be compensated by diminishing the amount of the color former in the mixture giving the undesired tint. Another simple expedient is to dissolve the mixture of the color formers in a color forming developer and developing out an exposed silver halide emulsion. By the color of the dye image in the color developed film, the correction of the ratio of any one of the color formers in the mixture may be made. Substantially neutral dye images can also be produced by the use of color developer solution described in Example 2 of U. S. P. 1,939,231.

The following are examples of the cyan, magenta, and yellow color formers which can be utilized in admixture to yield a substantially neutral gray dye image:

Cyan

1 - hydroxy - 2 - naphthoylamino - 2' - methyloctadecylaminobenzene-5-sulfonic acid 1 - acetylamino - 3,5 - bis(2' - hydroxy - 3',4'-dimethoxybenzoylamino) -benzene 1-(phenyl-3'-methylene-ω-sulfonic acid)-3-heptadecyl-5-pyrazolone 1 - hydroxy - N - (3' - oleylamino - 4' - sulfophenyl) -2-naphthamide-4-sulfonic acid 1 - hydroxy - N - (3' - octadecylamino - 4' - carboxyphenyl) -2-naphthamide-4-sulfonic acid 1 - hydroxy - N - (3' - octadecylamino - 4' - sulfophenyl) -2-naphthamide-4-sulfonic acid 1 - hydroxy - N - octadecylnaphthamide - 4 - sulfonic acid Additional examples of suitable cyan color fomers which may be utilized in accordance with the present invention are disclosed in U. S. P. 2,156,821; 2,179,239; 2,323,590; 2,357,394; 2,357,395, 2,418,747; 2,445,252, and 2,500,487.

Magenta

Disulfo - 7,7' - stearylamino - 3,3' - methylene-bis(4 - hydroxycoumarin) - 4,4'-bis(1 - phenyl-3-heptadecyl-5-pyrazolone)

1-(4'-methoxyphenyl) -3'-sulfonic acid)-3-heptadecyl-5-pyrazolone

1 - hydroxy - 4 - sulfo - 5,7 - dichloro - N - octadecyl-2-naphthamide

1 - hydroxy - 4 - sulfo - 5 - chloro - N - octadecyl-2-naphthamide

1 - hydroxy - N - (3' - stearoylamido - 2' - methyl-5'-sulfophenyl-2-napthamide

1 - hydroxy - 4 - sulfo - 6 - bromo - N - hexadecyl-2-napthamide

Other suitable magenta color formers are disclosed in U. S. P. 2,200,306; 2,265,221; 2,322,907; 2,354,552; and 2,437,063.

Yellow

Phenacylpicolinium chloride

Tetephthaloylbiacetic acid anilide

Quinolyl-2-pyroracemic acid 4-stearoylaminophenol-racemic acid

1 - acetoacetylamino - 4 - octadecylaminobenzene-3-sulfonic acid 3,5-di(acetylaceto) -1-phenyl guanazol 2 - (4' - benzoylacetaminophenyl) - 1 - octadecylbenzimidazole-5-sulfonic acid 3 - [p-stearoylaminobenzoylacetamido] - isophthalic acid 4 - [p - stearoylaminobenzoylacetamido] - phenylglycine 4-[α-sulfostearoylaminobenzoyl]-acetanilide p-lauroylaminobenzoylacetanilide 4 - [m -stearoylamidobenzoylacetamino] - benzoic acid 3 - benzoylacetamino - 4 - [N - methyl - N - octadecylamino]-benzoic acid Other suitable yellow color formers are disclosed in U. S. P. 2,154,981; 2,186,735; 2,214,483; and 2,376,679.

Instead of employing the conventional cyan, magenta, and yellow color formers, azine color formers, such as the following may be employed:

Azine-cyan

Dodecyl urethane of β-sulfoethyl J acid

Dodecyl urethane of benzyl J acid

Octadecyl urethane of methoxymethyl J acid 2-hexadecyl urethane of phenyl J acid 8-pentadecyl urethane of p-chlorophenyl J acid

Azine-magenta

2 - (6' - chloro - 8' - hydroxy - 2' - phenylcinchoninoylamino) - 6 - myristoylamino - toluene-4-sulfonic acid 8' - hydroxyquinanilide - 2 - methyl - 3 - stearoylamido-5-sulfonic acid Octadecyl-1-hydroxy-2-naphthoylamide Sodium salt of 4''-stearylaminobenzoyl-3'-aminobenzenesulfonyl - 1 - amino - 8 - hdyroxynaphthalene-3,6-disulfonic acid Additional azine-cyan and azine-magenta color formers, which upon admixture with azine-yellow color formers and upon development with aromatic triamines, yield substantially neutral gray dye images may be found in U. S. P. 2,414,491 and 2,486,440. Illustrative triamine developers for such azine dyes are also found in these patents.

Azine-yellow p-Cyanoacetyl-β-octadecenylsuccinalic acid

2 - (m - benzoylacetamidophenyl) - 1 - octadecyl-5-benzimidazole-sulfonic acid

2 - p - benzoylacetamidobenzamido - 6 - stearoylamino-p-toluene-sulfonic acid

2 - (p - benzoylacetamidophenyl) - 1 - octadecyl-5-benzimidazole-sulfonic acid

In utilizing the foregoing color formers, it is necessary that the constitution thereof be such that they will not migrate from the blue sensitive lower layer to the green sensitive top layer of the bipack else color distortion may result upon color reversal development of the front element after the transfer of the image in the green sensitive layer.

In the event a developer soluble color former or mixtures thereof is used in determining the approximate ratio of each to yield a substantially neutral gray dye image, the migration of the color formers to be utilized in the lower blue sensitive layer of the front element and the red sensitive layer of the rear element may be rendered fast to diffusion by several ways, for instance, by including in the color former proper, a group, which in the sense of the dyestuff art is substantive to gelatin or so enlarges the molecule of color former that it is incapable of diffusing from gelatin. Examples of color formers which are rendered fast to diffusion by the first method are disclosed in U. S. P. 2,179,228. Examples of color formers which are rendered fast to diffusion by the second method are described in U. S. P. 2,154,918; 2,156,821; 2,178,612; 2,179,228; 2,179,238-9; 2,179,244; 2,186,849, and the like.

The auxiliary film which is temporarily laminated to the exposed front element contains approximately .5 to 5.0 milligrams of either an alkali sulfide or stannous chloride or colloidal silver, gold, gold sulfide, silver sulfide, and if desired, a black toning agent, such as mercaptobenzothiazole, per 100 square centimeters of film surface. As pointed out above, the exposed green sensitive layer of the front element of the bipack or preferably the gelatin layer of the auxiliary film may be coated with a developing solution containing hydroquinone, sodium sulfite, sodium or ammonium thiosulfate and a colloidal carrier to increase the viscosity, such as methylcellulose or carboxyethylcellulose. During the period of temporary lamination of the front element to the auxiliary film, the green sensitive record is developed and the residual silver halide, which is dissolved, diffuses to the gelatin layer of the auxiliary film where the silver complex salt is reduced. The positive image of the green record is formed in the gelatin layer of the auxiliary film which is stripped off, acid shortstopped and washed in water.

The front element is then subjected to an acid shortstop bath to prevent the action of the developer-fixer solution in the blue sensitive layer. The bi-pack film is washed in water, developed in a black and white developer, shortstopped, washed, re-exposed to white light, and then color developed either in the usual color developer containing either a primary amino developing agent or in the case of a bipack material in which the rear red sensitive and the front blue sensitive layers contain mixtures of azine color formers in an azine developer as described in U. S. P. 2,486,440. During this process, neutral gray or substantially neutral gray dye images are produced in the rear red sensitive element and in the lower blue layer of the front element of the bipack. The bipack is then subjected to the usual silver bleach bath containing ferricyanide and preferably an alkali halide, such as potassium bromide. The bleach converts all the silver into silver ferrocyanide or silver halide which is fixed out in a subsequent step leaving two films which now contain neutral or substantially neutral gray dye image in the red layer representing the red record and gray or substantially gray dye image in the blue sensitive layer representing the blue record with a minimum of absorption overlap. The green sensitive top layer now consists of a clear gelatin layer.

Separation positives of the green, blue and red records with a minimum of degradation are obtained on three separate materials without entailing the complex and time consuming devices heretofore recommended.

For a clearer understanding of the construction of the bipack material and separate film utilized in accordance with the present invention resort is made to the illustrations in the accompanying figures of drawing in which Figures 1 and 2 represent self-explanatory enlarged sectional views of the bipack and separate film, respectively.

Referring to the drawings, particularly to Figure 1, the rear element of the bipack material comprises the usual cellulose derivative support 4, coated with a red sensitive emulsion layer 3 containing a gray color former or a mixture of cyan, magenta and yellow color formers to yield a substantially neutral gray dye image. The front element of the bipack consists of a lower blue sentitive emulsion layer 5 containing a gray color former or a mixture of cyan, magenta, and yellow color formers to yield a substantially neutral gray dye image. Over this blue sensitive emulsion layer is coated a gelatin layer 6 containing any one of the usual yellow filter dyes or colloidal silver. In place of gelatin, a water-permeable colloidal carrier for the filter dye may be employed, such as, for example, hydroxyethylcellulose, polyvinyl alcohol, water-soluble salts of a dicarboxylic acid, esters of cellulose, and the like. The top green sensitive emulsion layer 7 contains no color formers.

The auxiliary film shown in Figure 2, which is temporarily laminated to the top layer of the exposed front element of the bipack of Figure 1, consists of the usual film base 4 over which is coated a gelatin or colloid layer containing an alkali sulfide, such as sodium, potassium, or lithium sulfide or stannous chloride in the concentration of .5 to 5.0 milligrams per square centimeters of film surface.

The invention is further illustrated by the following examples, it being clearly understood that the invention is not restricted thereto.

*Example I*

A photographic bipack, constructed as shown in Figure 1 and containing in the blue and red sensitive layers a gray color former of the type described in British Patent 430,517, was exposed through the base side of the front element of the bipack. The rear elements was temporarily laid aside in a light-tight enclosure. The auxiliary film was coated with a developer-fixer solution of substantially high viscosity of the following formula:

| | Grams |
|---|---|
| p-Methylaminophenol sulfate | 2.0 |
| Hydroquinone | 10.0 |
| Sodium sulfite (anhydrous) | 40.0 |
| Sodium hydroxide | 20.0 |
| Sodium thiosulfate | 7.0 |
| Potassium bromide | 0.5 |
| Carboxymethylcellulose | 5.0 |

Water to make 1 liter.

The coated surface was then brought in contact with the front element by means of a set of pressure rollers, followed by a drum, to insure good contact of the negative film during the developing and image transfer step. About 1 to 1½ minutes were required to develop the negative image in the top layer of the bipack and to transfer the residual silver halide of that layer onto the auxiliary film where a positive image representing the green record extract was deposited. After 45 seconds to about 1 minute, the auxiliary film which represents the green record of the exposed bipack material was stripped off and washed. The front element was then short-stopped in a weak acetic acid solution and thoroughly washed in water. It was then developed together with the rear element for 12 minutes at 68° F. in a developer of the following composition:

| | Grams |
|---|---|
| p-Monomethylaminophenol sulfate | 3 |
| Sodium sulfite | 50 |
| Hydroquinone | 6 |
| Sodium carbonate (monohydrate) | 40 |
| Sodium thiocyanate | 2 |
| Potassium bromide | 2 |

Water to make 1 liter.

The developed films were shortstopper for 3 minutes at 68° F. in a 5% aqueous solution of sodium bisulfite.

The films were washed for 2 minutes in running water at 68° F. and re-exposed to white light.

The re-exposed films were color developed for 15 minutes at 68° F. in a developer of the following composition:

| | Grams |
|---|---|
| p-Aminodiethylaniline hydrochloride | 4 |
| Sodium sulfite | 20 |
| Hydroxylamine hydrochloride | 2 |
| Sodium carbonate | 80 |
| Potassium bromide | 1 |

Water to make 1 liter.

The color developed films were rinsed for 4 minutes in running water at 68° F. and hardened for 5 minutes in a 3% aqueous solution of potassium chrome alum.

The hardened films were washed for 5 minutes in running water at 68° F. and then treated with a bleach bath of the following composition:

| | | |
|---|---|---|
| Di-potassium mono-sodium ferricyanide | grams | 100 |
| Potassium bromide | do | 15 |
| Disodium phosphate | do | 40 |
| Sodium bisulfate | do | 25 |
| Formalin (40%) | cc | 20 |

Water to make 1 liter.

The bleached films were washed for 5 minutes at 68° F. and then fixed for 5 minutes in a solution of the following composition:

| | Grams |
|---|---|
| Hypo | 200 |
| Borax | 10 |

Water to make 1 liter.

After fixing, the films were washed for 10 minutes in running water at 68° F. and dried. The rear element now has an image representing the red record and the front element now has an image representing the blue record in the bottom layer. The green record is on the auxiliary film. The yellow filter layer, as well as the emulsion top layer of the front element, was converted into clear gelatin layers. The red, green, and blue separations obtained as above are equal in quality to those obtained with a tricolor separation camera and can be utilized in any type of color printing.

*Example II*

A bipack constructed according to Figure 1 in which the red sensitive emulsion 3 contains a mixture consisting of 3.5 parts of each of cyan color formers, 1 - hydroxy - 2 - (2' - N - methyl - N-octadecylamino-5'-sulfo)naphthanilide and 1-hydroxy - 4 - sulfo - N - octadecylnaphthamide, 9 parts of the magenta color former, 1-(3'-sulfophenyl) - 3 - (4'' - stearylaminophenyl) - 5 - pyrazolone, and 6.5 parts of the yellow color former, p - stearylaminobenzoyl - 3,5 - dicarboxyacetanilide, to yield a substantially neutral gray dye image. The film was exposed through the base side and brought in contact with the separate film and processed as in the preceding example.

*Example III*

Example I was repeated with the exception that the blue sensitive layer and the rear red sensitive layer were free of color former and the color developer was replaced by a color forming developer of the following composition:

| | | |
|---|---|---|
| 1,5-dihydroxynaphthalene | grams | 2 |
| Acetone | mls | 80 |
| 2,5-dibromo-4-aminophenol | grams | 2 |
| Sodium carbonate (anhydrous) | do | 30 |

Water to make 1 liter.

Substantially neutral gray dye images were obtained in the blue and red sensitive layers when processing was completed as in Example I.

It is evident from the foregoing examples that the procedure employed in the preparation of tricolor separation negatives is simple and requires a shorter period of time. By merely choosing from a wide variety of bipack films in which the top layer does not contain a color former, it is possible to preserve the simplicity of using a regular motion picture camera and to obtain color separations equal in quality to those obtained with a tricolor separation camera.

Instead of employing a bipack as constructed above, it is possible to arrange the layers of the bipack in such a manner that the top layer of the front element is sensitized with a red sensitizing dye and the rear element is sensitized with a green sensitizing dye. Similarly, a bipack can be used in which the front element is a single layer, blue sensitive film, and the rear element is a two-layer film in which one of the layers is red sensitive and the other, green sensitive. The latent image in the top layer of the two-layer film is then developed in the auxiliary layer by transfer development. The blue sensitive single layer film and the lower layer of the double-layer film can contain non-diffusing color formers or the dye images can be formed by the use of developers which contain, in addition to a primary amino developing agent, a developer-soluble color former or mixture of color formers capable of forming a substantially gray dye image with the oxidation products of the developing agent.

It is to be understood, however, that the gray dye images described, constitute only a preferred form of the invention since they permit the use of white printing light. In cases where printing of the color separations can be done with colored lights, it is not necessary to form neutral gray dye images; colored dye images can be formed instead. For example, the lower layer in the double-layer element can be developed to a cyan colored image and the single-layer element to a yellow colored image. In that event, the printing operations are performed with red and blue light respectively.

In place of the neutral gray or colored dye images, black and white silver images can be formed in the lower layer of the double-layer film and in the single-layer film by first giving these layers a negative development, removing the negatively developed silver with an acidic oxidizing solution (for example, one of chromic acid or of sulfuric acid and an alkali bichromate), exposing the residual silver halide and developing it in a non-color forming developer, such as a p-methylaminophenol-hydroquinone developer, followed by fixing and washing.

These two silver images and the silver image in the auxiliary film which, together constitute three color separation positives can be readily converted into negatives in the following manner. The three films are impregnated with a solution of a black bleachable azo dye or a mixture of bleachable azo dyes which together yield a black. If these dyes do not have adequate substantivity to gelatin, they can be rendered substantive by treatment with a solution of diphenylbiguanide or similar compounds described in U. S. P. 2,046,067, 2,075,190, and 2,317,184, which are known to act as precipitating agents for acid dyes. The dyed films are washed and subjected to a dye bleach solution as described in U. S. P. 2,020,775, 2,217,554, 2,270,118, and 2,341,034, which destroys the dyes imagewise in situ with the developed silver. After converting the silver into a silver halide with a ferricyanide-bromide solution, fixing and washing, there remain three substantially gray separation negatives which represent the red, green and blue records of the original. It is to be understood that non-neutral images can be made in a similar manner by the use of other than neutral dyes or dye mixtures.

Separation negatives can also be obtained by the following procedure: The auxiliary layer, which contains one or more non-diffusing azo-substituted color formers described in U. S. P. 2,453,661, 2,455,169, 2,455,170, and 2,521,908, is brought into contact with the top layer of the two-layer element in the presence of a viscous color developer containing a p-phenylene-diamine developing agent, sodium sulfite, sodium thiosulfate, a strong alkali and a viscosity increasing agent, such as carboxymethylcellulose. After about 1 minute, the auxiliary layer which contains positive developed dyestuff images, is stripped off, and immersed in a strongly acidic solution as described in U. S. P. 2,434,272. The developed dye images are destroyed and a negative gray azo dye image composed of the originally incorporated colored couplers is obtained.

The lower layer of the double-layer element and the single-layer film are developed directly to negatives either by the use of non-diffusing color forming components in these layers or by color forming developer solutions containing one or more developer-soluble color formers.

By employing the non-diffusing color formers described in U. S. P. 2,453,661, 2,455,169, 2,455,170, and 2,521,908 in the lower layer of the double-layer element and in the single-layer film and developing these layers with p-dialkylaminoaniline developers followed by the destruction of the azomethines and indoaniline type dyes formed with acid solutions as described in U. S. P. 2,434,272, positive azo dye images will be obtained.

Instead of employing azo dyes and forming the images either by dye bleaching in the presence of silver or by the destruction of developed azomethine and indoamine dyes, it is possible to form azo dyes by reacting color formers with hydrazines as described in U. S. P. 2,196,734, 2,339,213, 2,270,929, or with aromatic sulfohydrazides as described in U. S. P. 2,424,256. Similarly, azo dye images can be produced in layers containing non-diffusing color formers by color development with a p-phenylenediamine developer, reacting unused color formers with diazonium compounds to form azo dyes in the areas where no color development has taken place and destroying the first developed dyestuff images as described in U. S. P. 2,297,732, 2,362,519, and 2,394,527.

By the term "color former" as used in the appended claims, it is intended to embrace a single color former yielding upon color forming development a neutral or substantially neutral gray dye image, and a mixture of cyan, magenta, and yellow color formers in such proportions that upon color development yield a neutral or substantially neutral gray dye image. Similarly, by the term "aromatic developing agent" is meant not only the aromatic primary amino developing agents customarily used for color developing multilayer materials but also the azine developers, i. e., triamines.

While I have disclosed the preferred embodiments of my invention and the preferred modes of carrying the same into effect, it will be readily apparent to those skilled in the art that many variations may be made therein without departing from the spirit thereof. For example, the developer-fixer solution may consist of any one of the silver halide developing solutions normally used in black and white development to which has been added a fixing agent, such as ammonium or sodium thiosulfate and a sufficient quantity of a water or alkali dispersible colloidal carrier, such as polyvinyl alcohol, hydroxyethylcellulose, methylcellulose, carboxymethylcellulose, and the like, so as to increase the viscosity of the developer-fixer solution and preclude its diffusion into the green sensitive layer of the bipack. Accordingly, the scope of my invention is to be limited only by the appended claims.

I claim:

1. In the process of preparing tricolor separations from an exposed bipack color film comprising a front element and a rear element, at least one of said elements bearing two superimposed silver halide emulsion layers and the other of said elements bearing a single silver halide emulsion layer, one of said emulsion layers being red sensitive, another being blue sensitive and the third being green sensitive, and wherein the outermost sensitive layer of the said two-layer element is devoid of color former and the innermost sensitive layer of the said two-layer element and the sensitive layer of the single layered element contains color formers fast to diffusion capable of reacting with the oxidation products of an aromatic amino developing agent to yield substantially neutral gray dye images in said layers, the improvement which comprises contacting the outermost layer of the exposed two layered element with an auxiliary film comprising an impermeable support bearing a colloidal layer containing a member selected from the group consisting of colloidal silver, colloidal silver sulfide, colloidal gold, colloidal gold sulfide, alkali sulfide, and stannous chloride while forcing the colloidal layer of said auxiliary film against the surface of said outermost layer in the presence of a developer-fixer solution for a length of time sufficient to develop the negative image and dissolve the residual silver halide in said outermost layer and transfer it to the colloidal layer of the auxiliary film, stripping off and washing the auxiliary film containing the record representing the color record of the outermost sensitive layer of the two-layer element, processing the rear and front elements by color reversal development, using as the reversal developer said aromatic amino developing agent bleaching and fixing the same to positives containing the two color records representing the color records of the innermost sensitive layer of the two-layer element and the sensitive layer of the single layer element respectively.

2. In the process of preparing tricolor separations from an exposed bipack color film comprising a front element bearing on a support two superimposed silver halide emulsion layers, the outermost layer being sensitized to green and devoid of color former, the lower layer being blue sensitive and the rear element comprising a support bearing a red sensitive silver halide emulsion layer, the red sensitive layer of the rear element and the blue sensitive layer of the front element containing color formers fast to diffusion capable of reacting with the oxidation products of an aromatic amino developing agent to yield substantially neutral gray dye images in each of said layers, the improvement which comprises contacting the outermost layer of the exposed front element with an auxiliary film comprising an impermeable support bearing a colloidal layer containing a member selected from the group consisting of colloidal silver, colloidal silver sulfide, colloidal gold, colloidal gold sulfide, alkali sulfide, and stannous chloride while forcing the colloidal layer of said auxiliary film against the surface of the outermost layer of the front element in the presence of a developer-fixer solution for a sufficient length of time to develop the negative image and dissolve the residual silver halide in the said outermost layer and transfer it to the colloidal layer of the auxiliary film, stripping off and washing the auxiliary film containing the green record, processing the rear and front elements by color forming reversal development, using as the reversal developer said aromatic amino developing agent bleaching and fixing the same to positives containing the red and blue records respectively.

3. In the process of preparing tricolor separations from an exposed bipack color film comprising a front element bearing on a support two superimposed silver halide emulsion layers, the outermost layer being sensitized to red and devoid of color former, the lower layer being blue sensitive and the rear element comprising a support bearing a green sensitive silver halide emulsion layer, the green sensitive layer of the rear element and the blue sensitive layer of the front element containing color formers fast to diffusion capable of reacting with the oxidation products of an aromatic amino developing agent to yield substantially neutral gray dye images in each of said layers, the improvement which comprises contacting the outermost layer of the exposed front element with an auxiliary film comprising an impermeable support bearing a colloidal layer containing a member selected from the group consisting of colloidal silver, colloidal silver sulfide, colloidal gold, colloidal gold sulfide, alkali sulfide, and stannous chloride while forcing the colloidal layer of said auxiliary film against the surface of the outermost layer of the front element in the presence of a developer-fixer solution for a sufficient length of time to develop the negative image and dissolve the residual silver halide in the said outermost layer and transfer it to the colloidal layer of the auxiliary film, stripping off and washing the auxiliary film containing the red record, processing the rear and front elements by color forming reversal development, using as the reversal developer said aromatic amino developing agent bleaching and fixing the same to positives containing the green and blue records respectively.

4. In the process of preparing tricolor separations from an exposed bipack color film comprising a front element and a rear element, one of said elements bearing two superimposed silver halide emulsion layers and the other of said elements bearing a single silver halide emulsion layer, one of said emulsion layers being red sensitive, another being blue sensitive, and the third being green sensitive, and wherein at least the outermost sensitive layer of the said two-layer element is devoid of color former, the improvement which comprises contacting the outermost layer of the exposed two-layered element with an auxiliary film comprising an impermeable support bearing a colloidal layer containing a member selected from the group consisting of colloidal silver, colloidal silver sulfide, colloidal gold, colloidal gold sulfide, alkali sulfide, and stannous chloride while forcing the colloidal layer of said auxiliary film against the surface of the outermost layer of the front element in the presence of a developer-fixer solution for a length of time sufficient to develop the negative image and dissolve the residual silver halide in said outermost layer and transfer it to the colloidal layer of the auxiliary film, stripping off and washing the auxiliary film containing the record representing the color record of the outermost sensitive layer of the two-layer element, processing the rear and front elements by color reversal development in the presence of color formers capable of reacting with the oxidation products of a primary aromatic amino developing agent to form substantially neutral gray dye images, using as the first developer a black and white developing agent incapable of reacting with said color formers and using as the reversal developer, said aromatic amino developing agent, bleaching and fixing the rear and front elements to positives containing the two color records representing the color records of the innermost sensitive layer of the two-layer element and the sensitive layer of the single layer element respectively.

5. In the process of preparing tricolor separations from an exposed bipack color film comprising a front element and a rear element, one of said elements bearing two superimposed silver halide emulsion layers and the other of said elements bearing a single silver halide emulsion layer, one of said emulsion layers being red sensitive, another being blue sensitive and the third being green sensitive, the improvement which comprises contacting the outermost layer of the exposed two-layered element with an auxiliary film comprising an impermeable support bearing a colloidal layer containing a member selected from the group consisting of colloidal silver, colloidal silver sulfide, colloidal gold, colloidal gold sulfide, alkali sulfide, and stannous chloride while forcing the colloidal layer of said auxiliary film against the surface of the outermost layer of the front element in the presence of a developer-fixer solution for a length of time sufficient to develop the negative image and dissolve the residual silver halide in said outermost layer and transfer it to the colloidal layer of the auxiliary film, stripping off and washing the auxiliary film containing the record representing the color record of the outermost sensitive layer of the two-layer element, processing the rear and front elements by color reversal development, including development in a black and white developer containing a developing agent incapable of coupling with color formers, shortstopping, second exposure and color development in a developer comprising an aromatic amino developing agent and color formers capable of reacting with the oxidation products of said aromatic amino to form substantially neutral gray dye images, bleaching and fixing, to form positives containing the two color records representing the color records of the innermost sensitive layer of the two-layer element and the sensitive layer of the single layer element respectively.

6. In the process of preparing tricolor separations from an exposed bipack color film comprising a rear element bearing on a support two superimposed silver halide emulsion layers, the upper layer being sensitized to green and devoid of color former, and the lower layer being red sensitive, and the front element comprising a support bearing a blue sensitive silver halide emulsion layer, a red sensitive layer of the rear element and the blue sensitive layer of the front element containing color formers fast to diffusion capable of reacting with the oxidation products of an aromatic amino developing agent to yield substantially neutral gray dye images in each of said layers, the improvement which comprises contacting the upper layer of the exposed rear element with an auxiliary film comprising an impermeable support bearing a colloidal layer containing a member selected from the group consisting of colloidal silver, colloidal silver sulfide, colloidal gold, colloidal gold sulfide, alkali sulfide, and stannous chloride while forcing the colloidal layer of said auxiliary film against the surface of the upper layer of the rear element in the presence of a developer-fixer solution for a sufficient length of time to develop the negative image and dissolve the residual silver halide in the said upper layer and transfer it to the colloidal layer of the auxiliary film, stripping off and washing the auxiliary film containing the green record, processing the rear and front elements by color forming reversal development, using as the reversal developer said aromatic amino developing agent, bleaching and fixing the same to positives containing the red and blue records respectively.

7. In the process of preparing tricolor separations from an exposed bipack color film comprising a rear element bearing on a support two superimposed silver halide emulsion layers, the upper layer being sensitized to red and devoid of color former, and the lower layer being green sensitive and the front element comprising a support bearing a blue sensitive silver halide emulsion layer, the green sensitive layer of the rear element and the blue sensitive layer of the front element containing color formers fast to diffusion capable of reacting with the oxidation products of an aromatic amino developing agent to yield substantially neutral gray dye images in each of said layers, the improvement which comprises contacting the upper layer of the exposed rear element with an auxiliary film comprising an impermeable support bearing a colloidal layer containing a member selected from the group consisting of colloidal silver, colloidal silver sulfide, colloidal gold, colloidal gold sulfide, alkali sulfide, and stannous chloride while forcing the colloidal layer of said auxiliary film against the surface of the upper layer of the rear element in the presence of a developer-fixer solution for a sufficient length of time to develop the negative image and dissolve the residual silver halide in the said upper layer and transfer it to the colloidal layer of the auxiliary film, stripping off and washing the auxiliary film containing the red record, processing the rear and front elements by color forming reversal development, using as the reversal developer said aromatic amino developing agent bleaching and fixing the same to positives containing the green and blue records respectively.

References Cited in the file of this patent

UNITED STATES PATENTS

| Number | Name | Date |
|---|---|---|
| 2,352,014 | Rott | June 20, 1944 |

FOREIGN PATENTS

| Number | Country | Date |
|---|---|---|
| 485,862 | Great Britain | May 25, 1938 |
| 900,266 | France | Sept. 25, 1944 |
| 634,169 | Great Britain | Mar. 15, 1950 |